(12) United States Patent
Codina et al.

(10) Patent No.: US 6,698,974 B2
(45) Date of Patent: Mar. 2, 2004

(54) SYSTEM FOR ELECTRICALLY POWERING AND VIBRATING A COMPACTING ROLLER

(75) Inventors: George Codina, Gardena, CA (US); Dean R. Potts, Maple Grove, MN (US); Thomas J. Richards, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/015,100

(22) Filed: Dec. 11, 2001

(65) Prior Publication Data

US 2003/0108389 A1 Jun. 12, 2003

(51) Int. Cl.[7] .............................................. E01C 19/38
(52) U.S. Cl. ...................................... 404/117; 404/122
(58) Field of Search ............................ 74/86; 310/90.5; 404/103, 117, 122

(56) References Cited

U.S. PATENT DOCUMENTS

| | | | |
|---|---|---|---|
| 3,575,255 A | * | 4/1971 | Wickstrom .................. 180/168 |
| 3,932,069 A | | 1/1976 | Giardini et al. |
| 4,422,375 A | * | 12/1983 | Morganti ..................... 100/210 |
| 5,462,388 A | * | 10/1995 | Polacek ....................... 404/113 |
| 5,934,824 A | * | 8/1999 | Vural .......................... 404/117 |
| 6,008,599 A | * | 12/1999 | Beck ........................... 318/254 |
| 6,025,668 A | * | 2/2000 | Kolomeitsev ............... 310/187 |
| 6,127,754 A | * | 10/2000 | Kolomeitsev et al. ..... 310/75 R |
| 6,150,778 A | * | 11/2000 | Morris ........................ 318/254 |

* cited by examiner

*Primary Examiner*—Thomas B. Will
*Assistant Examiner*—Raymond W. Addie
(74) *Attorney, Agent, or Firm*—Howard & Howard

(57) ABSTRACT

A system for variably powering and vibrating a compaction roller on a compacting machine for use in compacting surfaces. The system includes a chassis and at least one compaction roller rotatably journaled to the chassis. The compaction roller forms the rotor of a variable reluctance motor for driving the roller in a rotational manner and for vibrating the roller.

8 Claims, 3 Drawing Sheets

SYSTEM FOR ELECTRICALLY POWERING AND VIBRATING A COMPACTING ROLLER

TECHNICAL FIELD

This invention relates generally to system for powering a compacting machine and, more particularly, to a system for electrically powering and vibrating a compacting machine roller in a variable manner.

BACKGROUND ART

Asphalt has an extensive history in the development of the construction industry and is widely utilized for a number of applications in our public and commercial infrastructure. The technology and composition of various asphalt combinations have been developed over the years such that various asphalt combinations can be mixed in a manner to be specially tailored to a specific application. They can be mixed with various sizes, distributions, and shapes of aggregate, as well as different types of aggregate such as gravel, old tires, coal fly ash, and many others. Each combination or mixture of asphalt can also be applied at different temperatures. Typically, the asphalt mixture is transported to the work site, poured in loose form, leveled and then compacted to provide a relatively hard, smooth surface. Thus, each asphalt mixture exhibits its own characteristics and the optimum compaction of each mixture is dependent on those characteristics. Incorrect compaction, either too much or too little, can induce cracking of the asphalt and therefore premature breakdown of the paved surface.

Compacting machines in various forms are well known in the art. Especially well known are self-propelled mobile compacting machines used for compacting soil, rock and asphalt for roadways, construction, and the like. Present compacting machines generally comprise a heavily weighted frame or chassis supported by one or more rollers to assist in provided compacting force. A gas or diesel engine is indirectly coupled with at least one of the rollers to power the compacting machine in a forward or reverse direction so that the machine can make multiple passes over the material in order to properly compact it into a hard surface for supporting vehicles and the like.

Compacting machines often include a hydraulic motor that rotates a shaft or mechanism having an off-center or eccentric weight at a predetermined speed to provide a vibrational component to the roller in addition to the weight of the machine thereby assisting in the compaction. Such hydraulic motors utilize operating fluids, which may spill or leak onto the asphalt or ground.

Most of these vibration-inducing mechanisms operate at a frequency and amplitude that are preset at manufacture, or the mechanism may only have a minimal number of alternate adjustments and are not readily variable. Thus, there is a need in the industry for a compacting machine that can be vibration adjusted to provide an optimum compaction for different materials while minimizing the danger of contaminating the environment.

The present invention is directed to overcoming one or more of the problems or disadvantages associated with the prior art.

DISCLOSURE OF THE INVENTION

In one aspect of this invention, a system is provided for variably powering and vibrating a compaction roller on a compacting machine for use in compacting surfaces. The system includes a chassis and at least one compaction roller rotatably journaled to the chassis. The compaction roller forms the rotor of a variable reluctance motor for driving the roller in a rotational manner and for vibrating the roller.

In another aspect of the invention, a compacting machine is provided for compacting surfaces. The compacting machine includes a chassis and at least one compaction roller rotatably journaled to the chassis for compacting the surface. At least one electric motor is also included wherein a first portion of the motor is affixed to the chassis and a second portion of the motor is affixed to the compaction roller for direct electrical drive of the compaction roller.

BEST MODE FOR CARRYING OUT THE INVENTION

Figure 1:
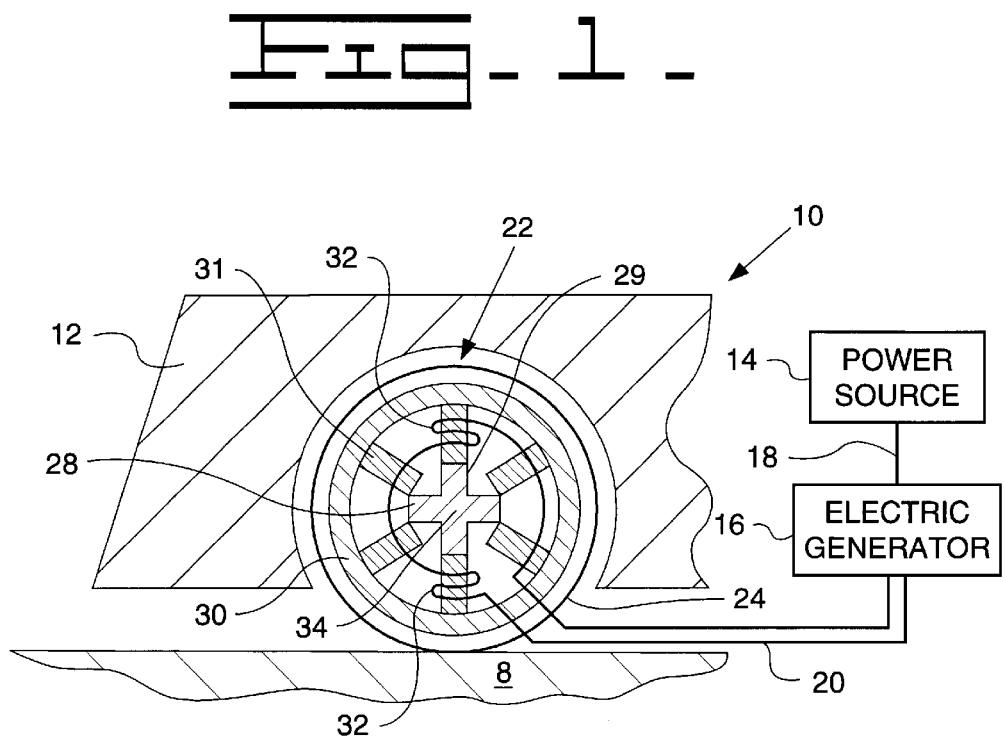
FIG. 1 is an elevation view of the roller portion of a compacting machine embodying the present invention
Figure 2:
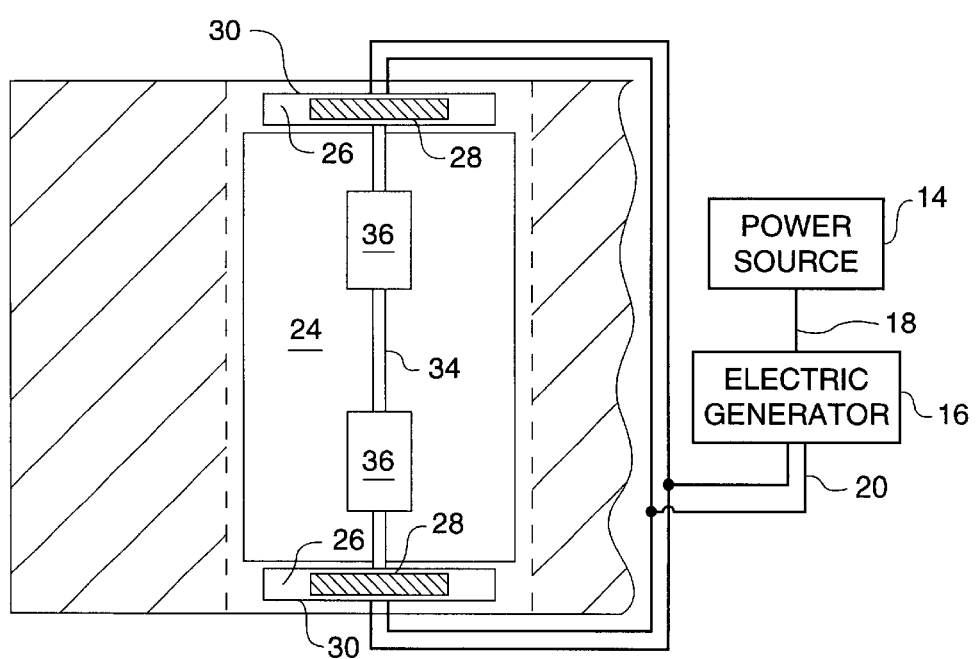
FIG. 2 is a top plan view of the embodiment of FIG. 1.

Turning now to FIGS. 1 and 2, there is shown the compacting roller portion of a compacting machine of the present invention, denoted generally by reference numeral 10 for compacting a surface 8. Compacting machine 10 includes a chassis 12 wherein a power source 14 is mounted thereon. Power source 14 is connected to an electric generator 16 by a drive 18. Power source 14 can be any type of independent power source known in the industry such as an internal combustion engine of either the gasoline or diesel powered type. Electric generator 16 is also of a type that is well known in the industry and can be specifically selected to provide the type and magnitude of electric power desired for use on compacting machine 10. Drive 18 is selected to transfer the power output of power source 14 to the drive input of electric generator 16 including, but not limited to, driveshafts, gears, flexible belts, or a hybrid combination thereof.

Chassis 12 defines a roller cavity 22, preferably semi-cylindrical in shape, in which is received a compaction roller 24. Compaction roller 24 is also cylindrical in shape and of a smaller diameter than roller cavity 22. Roller 24 rotates about an axis 34 which is journaled to chassis 12 by bearings 36. An electric motor 26 is integrated with compaction roller 24, and in a preferred embodiment electric motor 26 is a variable reluctance motor. Electrical conductors 20 interconnect the electrical output of electric generator 16 with variable reluctance motors 26.

Variable reluctance motor 26 is comprised of a rotor 28 and a stator 30. Rotor 28 is formed from a magnetic material and includes a plurality of rotor poles 29. Stator 30 is formed about the periphery of rotor 28 such that rotor 28 rotates within stator 30. Stator 30 includes a plurality of stator poles 31 that extend proximate to rotor 28. Each stator pole 31 has a coil 32 wound thereabout and wherein coils 32 are electrically coupled to electrical conductors 20 to transmit the electric power output by electric generator 16 through coils 32 at each stator pole 31. Rotor 28 is affixed to compaction roller 24 such that any rotation of rotor 28 causes a like rotation of compaction roller 24. In this configuration stator 30 is affixed in a non-rotational manner to chassis 12.

The description and discussion with respect to variable reluctance motors herein illustrates the general and theoretical operation of a variable reluctance motor, and those skilled within the variable reluctance motor art will recognize and understand those specific design features of a variable reluctance motor that are applicable to adapting this known technology to the embodiments disclosed herein.

Figure 3:
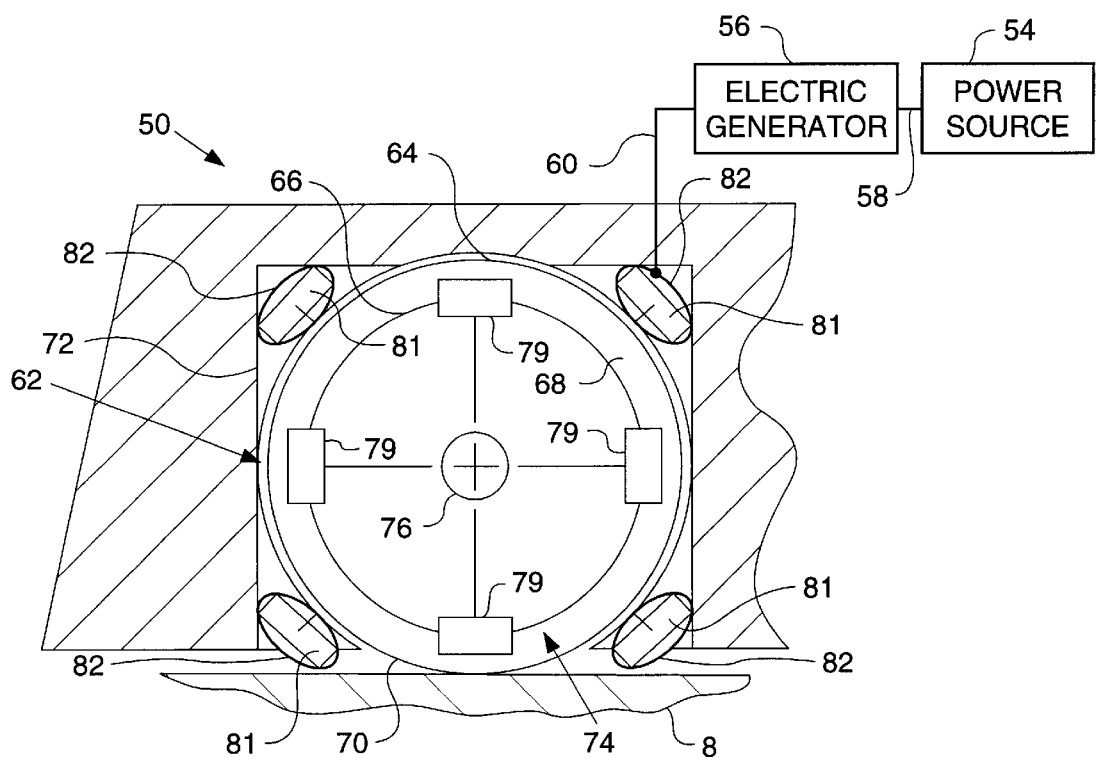
FIG. 3 is an elevation view of the roller portion of a compacting machine wherein the roller comprises the reluctance motor rotor.
Figure 4:
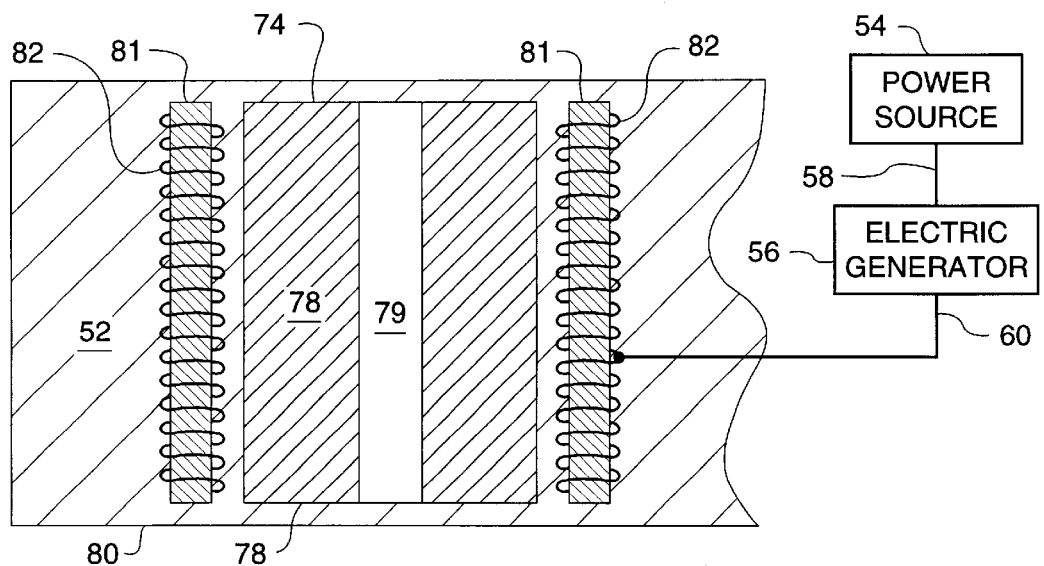
FIG. 4 is a top plan view of the embodiment of FIG. 3.

Turning now to FIGS. 3 and 4, a system for variably powering and vibrating a compaction roller by incorporating a variable reluctance electric motor into a compacting machine is denoted generally by reference numeral 50, and also references a compacting machine incorporating the system. In this embodiment, compacting machine 50 comprises a chassis 52 upon which is mounted a power source 54 and an electric generator 56. Electric generator 56 is coupled to power source 54 by a drive 58, and as in compacting machine 10 illustrated in FIGS. 1 and 2, power source 54 is a known independently operating power source such as a diesel or gasoline internal combustion engine. Drive 58 can comprise individually or in combination gears, driveshafts, or belts to transfer the power generated by power source 54 to electric generator 56. Chassis 52 defines a roller cavity 62 therein which is preferably cylindrical in shape. A compaction roller 74 is received within roller cavity 62 and has an outer drum 70 that bears upon surface 8 such as a roadway as compacting machine traverses across surface 8. Compaction roller 74 is rotationally journaled to chassis 12 with bearing 76 such that a longitudinal axis of compaction roller 74 coincides with the longitudinal axis of cylindrical roller cavity 62. Bearing 76 in the preferred embodiment is a magnetic bearing.

A plurality of stator poles 81 each having a coil 82 wound therearound are affixed to chassis 52 such that each combined stator pole 81 and coil 82 are positioned proximate to the periphery of cylindrical roller cavity 62. Each combined stator pole 81 and coil 82 are coupled to electric generator 56 by electrical conductors 60 that, for simplicity, are shown in FIGS. 3 and 4 as being coupled to only one combined stator pole 81 and coil 82. In this manner, the combination of chassis 52 and the plurality of combined stator poles 81 and coils 82 become the stator 80 of a variable reluctance motor.

Compaction roller 74 comprises a roller core 66 to which are affixed a plurality of rotor poles 79 thereabout. Each rotor pole 79 is formed of a magnetic material, and further wherein each rotor pole 79 is affixed to roller core 66 such that the longitudinal axis of each rotor pole 79 is substantially parallel to the central axis of roller core 66 and compaction roller 74. A non-conductive layer 68 is applied to the exterior of the combined roller core 66 and rotor poles 79 to form the outer drum 70 of compaction roller 74. Outer drum 70 is formed as a cylinder to facilitate uniform contact and rotation across surface 8. Nonconductive layer 68 is preferably comprised of a highly durable thermoplastic, or other such composite material that exhibits favorable wear characteristics in an abrasive environment such as the compaction of asphalt and other like materials. The final diameter of cylindrical compaction roller 74 and the diameter of cylindrical roller cavity 62 are selected to provide a desired gap 64 between the outer drum 70 of compaction roller 74 and an inner periphery of roller cavity 62. A skirt 72 can be affixed to each side of chassis 52 to further enclose cylindrical roller cavity 62 and thereby prevent undesired airflow through gap 64.

The present invention is advantageously applicable to powering a compacting machine 52 (those skilled in the art will understand that the operation of compacting machines 10 and 52 are substantially identical and thus this discussion will reference only compacting machine 50 with the knowledge that compacting machine 10 operates substantially identically thereto). Compacting machine 50 transmits power from power source 54 to electrical generator 56 via drive 58 to produce electrical power to drive the variable reluctance motor formed by rotor 78 and stator 80. Electric generator 56 is coupled to the plurality of combined stator poles 81 and coils 82 via electrical conductor 60.

Figure 5:
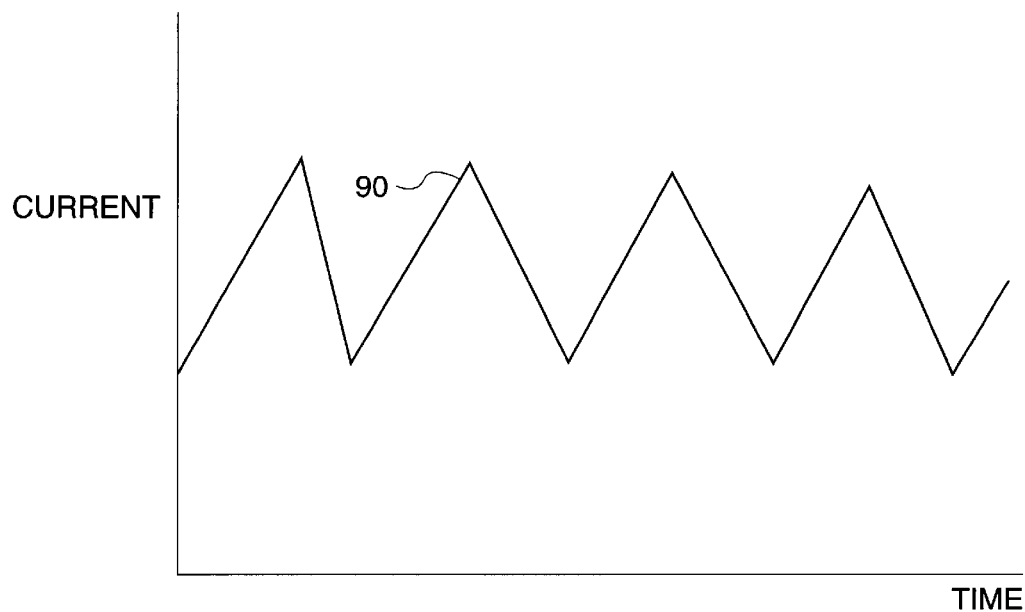
FIG. 5 is a curve representing the variable amperage curve powering the motor.

Electric generator 56 is controlled so as to provide a power signal of a varying current type such as the variable current drive signal 90 shown in FIG. 5. Functionally, a variable reluctance motor in general and as applied to compacting machine 50 is a brushless DC motor which includes a permanent magnet rotor. This simplicity of motor design and construction provides a very robust and reliable motor having a low manufacturing cost since fewer materials and less labor are required to construct such a motor as compared to other electric motor configurations.

Figure 6:
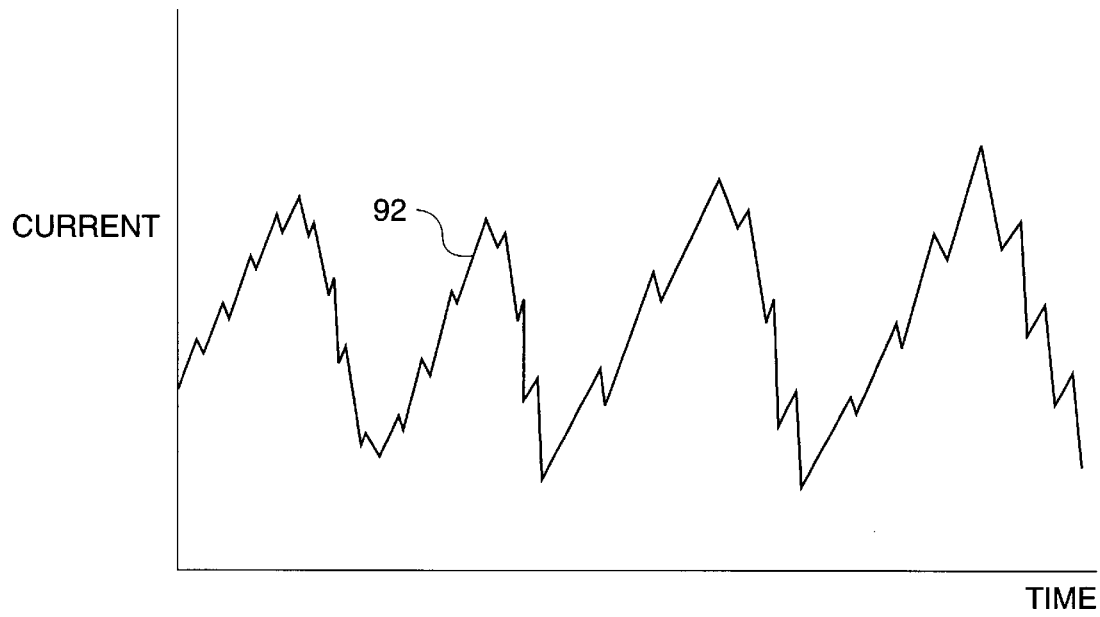
FIG. 6 is the curve of FIG. 5 including a power component to induce vibration of the roller.

FIG. 6 illustrates a modified power curve 92 wherein the drive signal 90 of FIG. 5 further includes a higher frequency variable current vibration signal modulated upon drive signal 90. As electrical power is applied to the individual combined stator poles 81 and coils 82 the stator pole 81 functions as an electromagnet and generates a magnetic field thereabout. The magnetic field generated by the stator poles 81 are not affected by non-conductive layer 84 and thus magnetically attract rotor poles 79. The higher frequency of the vibration signal induces a vibration of rotor 78 with respect to chassis 52 as a result of the varying magnetic forces induced by the high frequency power component.

The speed, torque and direction of rotation of compaction roller 70 can be selectively controlled by the frequency and amplitude of drive signal 90. In like manner, the drive signal 92 causes an additional magnetic attraction between stator poles 81 and rotor poles 79 in a manner to induce the vibration of compaction roller 70 with respect to chassis 52. By controlling the amplitude and frequency of the high frequency portion of signal 92, the frequency and amplitude of the roller 70 vibration can also be controlled by the operator of compacting machine 50.

The application of the electric power to coils 82 also causes an increase in thermal energy generated by and radiated from stator poles 81, and thus by selecting the size of gap 64, the degree of heating of roller 70 can be controlled to maintain roller 70 at an elevated temperature which is most conducive to the composition of the material, such as asphalt, to be compacted by machine 50. Skirt 72 can be affixed to each end of cylindrical roller cavity 62 to prevent ambient air from circulating therethrough and thereby creating an "oven" affect to assist in maintaining compaction roller 70 at a desired operating temperature. Bearings 76 in the preferred embodiment are magnetic bearings, and as such are permissive of the vibrational relationship between compaction roller 70 and chassis 52.

INDUSTRIAL APPLICABILITY

The incorporation of a variable reluctance motor to drive and power a compaction machine 50 can thus be seen to be advantageous to provide a degree of control heretofore unobtainable in previous compaction machine designs.

Specifically, the application and control of a variable current power signal to the variable reluctance motor driving the compacting machine 50 can provide at the user's discretion a desired compaction roller temperature, and amplitude and frequency of roller vibration not previously obtainable. Additionally, the incorporation of a variable reluctance motor eliminates the reliance upon a hydraulic motor to provide a vibrational component to the compaction roller and thus eliminates the potential for leaking and spilling of contaminating fluids on the surface to be compacted or upon the ground.

Other aspects and features of the present invention can be obtained from a study of the drawings, the disclosure, and the appended claims.

What is claimed is:

1. A system for variably powering and vibrating a compaction roller on a compacting machine for use in compacting surfaces, said system comprising:

a chassis;

at least one compaction roller rotatably journaled to said chassis and forming a rotor of a variable reluctance motor;

a plurality of stator poles affixed to said chassis around a periphery of said rotor, wherein magnetic fields produced by said rotor and said stator poles interact for vibrating said roller and driving said roller in a rotational manner.

2. The system according to claim 1 including magnetic bearings to journal said compaction roller to said chassis.

3. The system according to claim 1 wherein:

said chassis defines a cavity therein; and said roller is a cylinder received within said cavity and rotatably journaled about a longitudinal axis.

4. The system according to claim 1 wherein said compaction roller further includes a plurality of rotor poles formed from a magnetic material.

5. The system according to claim 4 wherein said compaction roller further comprises:

a core, wherein said plurality of rotor poles are affixed to a periphery of said core in a substantially longitudinal manner; and a non-conductive layer affixed to said core and said rotor poles such that an outer surface of said non-conductive layer forms a cylindrical surface for said compaction roller.

6. The system according to claim 1 wherein said cavity is defined by said chassis to be a cylinder having a longitudinal axis substantially coincident with said compaction roller longitudinal axis and said stator poles are distributed about said cylindrical cavity.

7. The system according to claim 6 wherein a diameter of said cylindrical cavity and a diameter of said compaction roller define a gap therebetween, said gap being selected to control heat transfer from said chassis and said stator poles to said compaction roller thereby heating said compaction roller to an operating temperature.

8. The system according to claim 7 including a skirt at each end of said cylindrical cavity for minimizing airflow therethrough and maintaining said compaction roller at said operating temperature.

\* \* \* \* \*